US012380410B2

(12) United States Patent
Kairali et al.

(10) Patent No.: US 12,380,410 B2
(45) Date of Patent: Aug. 5, 2025

(54) PROACTIVE PREPARATION OF REPAIR SERVICE SITE

(71) Applicant: INTERNATIONAL BUSINESS MACHINES CORPORATION, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 17/969,981

(22) Filed: Oct. 20, 2022

(65) Prior Publication Data

US 2024/0135334 A1 Apr. 25, 2024
US 2024/0232816 A9 Jul. 11, 2024

(51) Int. Cl.
*G06Q 10/20* (2023.01)
*G06Q 10/0631* (2023.01)
*G06Q 10/0633* (2023.01)

(52) U.S. Cl.
CPC ....... *G06Q 10/20* (2013.01); *G06Q 10/06315* (2013.01); *G06Q 10/0633* (2013.01)

(58) Field of Classification Search
None
See application file for complete search history.

(56) References Cited

U.S. PATENT DOCUMENTS

| 11,361,283 | B2 | 6/2022 | Bou-Ghannam | |
| 11,386,543 | B2 | 7/2022 | Ranca | |
| 11,874,653 | B2 * | 1/2024 | Graham | F01D 21/003 |

(Continued)

FOREIGN PATENT DOCUMENTS

| CN | 110348103 B | 12/2020 |
| CN | 114330780 A | 4/2022 |

OTHER PUBLICATIONS

Shubenkova et al., "Possibility of Digital Twins Technology for Improving Efficiency of the Branded Service System", 2018 Global Smart Industry Conference (GloSIC), 7 pages.

(Continued)

*Primary Examiner* — Folashade Anderson
(74) *Attorney, Agent, or Firm* — David K. Mattheis

(57) ABSTRACT

Systems, methods and/or computer program products predictively automating configurations of modular service zones servicing physical assets, maximizing reuse of service zone(s) and optimizing time for servicing a plurality of physical assets. Digital twin models of physical assets are classified, and arranged into workflows for the service zones, sequencing services performed on physical assets arriving at service centers and preparing service zones based on types of services requested, the estimated time of arrival and similarities between classifications of different digital twins of physical assets. Based on sequences of the workflow, arrival times of physical assets and overlap between parts, tools, machines, etc., within various service zones, service center coordinates robotic systems to arrange service zones in a manner that minimizes waiting time between services, maximizes the number of physical assets repaired within a period of time and reduces rearrangement of service zones between the services provided to different physical assets.

20 Claims, 6 Drawing Sheets

(56) References Cited

U.S. PATENT DOCUMENTS

| | | | |
|---|---|---|---|
| 11,900,296 B1* | 2/2024 | Lin | G06F 30/13 |
| 2004/0243736 A1* | 12/2004 | Hattrup | G06F 3/0656 |
| | | | 710/15 |
| 2013/0124032 A1 | 5/2013 | Singh | |
| 2018/0322472 A1 | 11/2018 | Russell | |
| 2019/0266295 A1 | 8/2019 | Masuda | |
| 2020/0193726 A1 | 6/2020 | Nakthewan | |
| 2020/0210966 A1* | 7/2020 | Nuthi | G06N 20/00 |
| 2020/0312036 A1* | 10/2020 | Nguyen | G06Q 50/02 |
| 2021/0096975 A1* | 4/2021 | DeLuca | G06F 11/3409 |
| 2021/0248845 A1 | 8/2021 | Nakhjavani | |
| 2021/0304153 A1 | 9/2021 | Calvillo | |
| 2021/0306416 A1 | 9/2021 | Mukhopadhyay | |
| 2022/0019212 A1* | 1/2022 | Mars | G05B 23/0283 |
| 2022/0036302 A1* | 2/2022 | Cella | G06N 20/00 |
| 2022/0114310 A1* | 4/2022 | Berti | G06N 20/00 |
| 2022/0130145 A1* | 4/2022 | Connary | G06T 15/20 |
| 2022/0134561 A1* | 5/2022 | Graham | B25J 9/1676 |
| | | | 700/245 |
| 2022/0198390 A1 | 6/2022 | Deluca | |
| 2022/0308734 A1 | 9/2022 | Wilkinson | |
| 2023/0110037 A1* | 4/2023 | Cella | G05B 13/0265 |
| | | | 700/117 |

OTHER PUBLICATIONS

PCT Notification of Transmittal of the International Search Report and the Written Opinion of the International Searching Authority, or the Declaration, Applicant's file reference F23W4732, International application, No. PCT/CN2023/125233, International Filing Date Oct. 18, 2023, Date of mailing Jan. 3, 2024, 8 Pgs.

* cited by examiner

PROACTIVE PREPARATION OF REPAIR SERVICE SITE

BACKGROUND

The present disclosure relates generally to the field of artificial intelligence (AI) and digital twin technology. More specifically, the use of AI and digital twins to classify maintenance profiles of physical assets, automating the arrangement of service centers responsible for maintaining or repairing the physical assets, optimizing the service zone's arrangements and workflow to maximize physical assets receiving services while minimizing waiting time.

A digital twin is a virtual representation of a physical object, system or other asset. The digital twin tracks changes to the physical object, system or other asset across the object's lifespan and records the changes as they occur within the physical object. Digital twins are a complex virtual model that is an exact counterpart to the physical asset existing in real space. Sensors and internet-of-things (IoT) devices connected to the physical asset collect data, often in real-time. The collected data can then be mapped to the virtual model of the digital twin. Any individual with access to the digital twin can see the real-time information about the physical asset operating in the real world without having to be physically present and viewing the physical asset while operating. Users, such as engineers, can use the digital twin to understand not only how the physical asset is performing, but to predict how the physical asset may perform in the future, using the collected data from sensors, IoT devices and other sources of data and information being collected. Moreover, digital twins can help manufacturers and providers of physical assets with information that helps the manufacturer understand how customers continue to use the products after the purchasers have bought the physical asset.

A classification algorithm can generally refer to a function that weighs input features in manner where the output separates two or more classes and then make decisions based on the results of all the classifiers. Classifier training can be performed to identify weights and functions that provide the most accurate and best separation between the classes of data. Linear discriminant analysis is the most basic classifier that identifies the linear weighting of multifactorial data as a means to maximize the distance between the means of the two classes. For many data sets however, relative separation between classes is not well delineated by a single line. Artificial neural networks, and random decision forests are a more recent computational approach that generates a more complex divisions between classes.

SUMMARY

Embodiments of the present disclosure relate to a computer-implemented method, an associated computer system and computer program products predictively automating the configuration of modular service zones for repairing or maintaining physical assets and maximizing reuse of a modular service zone for a plurality of physical assets. The computer-implemented method comprises: receiving, by a processor, service requests from a plurality of physical assets requesting performance of services on physical assets at the service site, a location of the physical assets and an estimated time of arrival for each of the physical assets at the service site; analyzing, by the processor, a digital twin model corresponding to each of the plurality of physical assets; creating, by the processor, a maintenance profile for each type of physical asset, describing classifications of the services for a corresponding physical asset including one or more machines, tools or parts required to perform the services on the physical asset; based on maintenance profiles of the physical assets and commonality between the one or more machines, tools or parts required to perform the services, creating, by the processor, one or more modular service zones within the service site comprising at least one of the one or more machines, the tools and the parts required to perform the services on the physical asset; and instructing, by the processor, a robotic system positioned within the service site to create or modify the modular service zone by positioning the machines, the tools and the parts for conducting each of the services on the physical assets within the modular service, prior to the estimated time of arrival of each of the physical assets at the service site.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
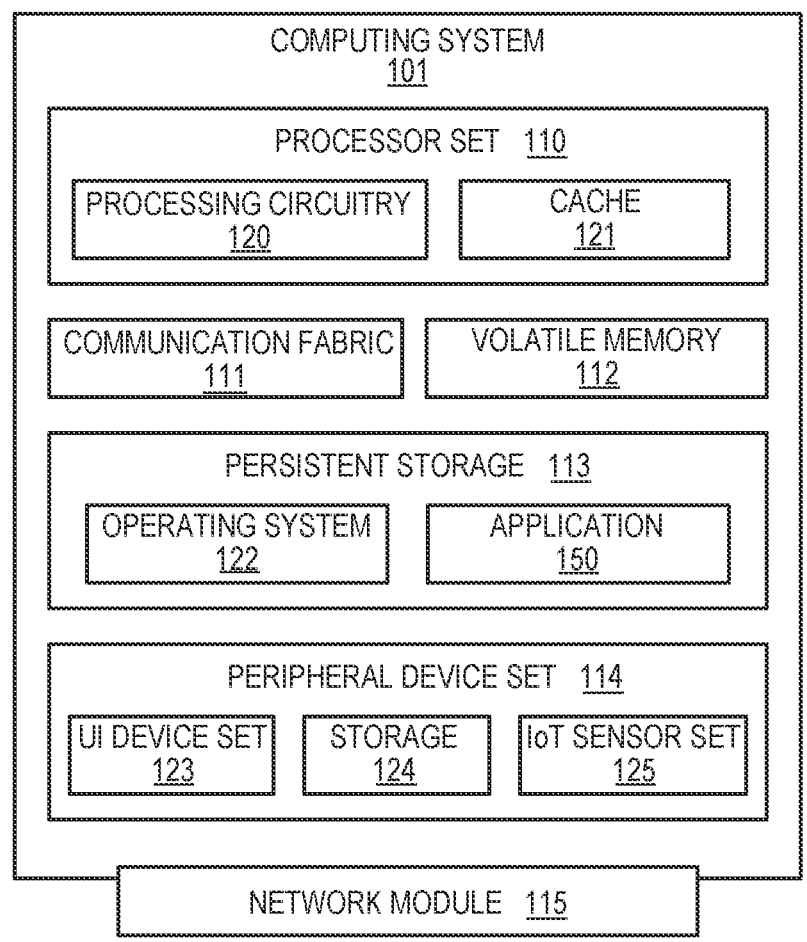
FIG. 1 depicts a block diagram illustrating an embodiment of a computer system and the components thereof, upon which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Physical assets, such as automotive vehicles, machines, devices or other apparatuses (referred to generally herein as "physical assets") may wear down over time, require maintenance to prevent breakage or malfunctions and/or need repairs from time to time to fix a physical asset that no longer functions as intended or has become inoperable. Often, physical assets that may need maintenance or repairs can be taken to a service center having the proper tools, parts, machinery, equipment and/or know-how to conduct repair procedures or maintenance on the physical asset. Different types of repairs and services can be requested for different types of physical assets that may be repaired or maintained within a service center. Service centers may be equipped with different types of machines, tools, equipment, parts or components, etc. in order to offer a broad array of different service to the different types of physical assets. Tools, machinery, equipment, etc. can be used or applied to similar types of physical assets and/or physical assets which may have the same or similar repair and/or maintenance procedures. In general, when a service is arranged with a service center, a physical asset, such as a vehicle, device or machine, may create a service log and send the collected data within the log to the service center, book an appointment and/or engage in various roadside or mobile repairs. The asset's information, location data, along with the appointment can be ingested at the service center to identify the type of services required, the spare parts needing to be on hand to conduct the repair or maintenance service, as well as the machines or tools that may be required to perform the requested service. The appropriate parts, tools, machines, etc., can be manually arranged by employees stationed at the service center within a particular location where the repairs are scheduled to occur.

Embodiments of the present disclosure recognize that initiating retrieval of the spare parts, and manually arranging the different equipment, machines, tools and parts needed to perform one or more services at the service center can be a slow or time-consuming process. Arranging the spare parts, tools, equipment and machines required to conduct a service can take a sufficient amount of effort, coordination and can require one or more service center employees to be drawn away from rendering actual services in other areas of the service center in order to ensure that a service zone within the service center is properly prepared for servicing the next physical asset scheduled for repair, maintenance or other services, in a timely manner. The process of arranging machines, tools, parts, components or other accessories for administering service can be further complicated by the number of different types of services that may be scheduled by the service center and numerous differences between physical assets, which can require re-arrangements of a service zone each time a new physical asset arrives for service. Therefore, there is a need for predictively automating configurations of modular service zones for repairing or maintaining physical assets maximizing reuse of the modular service zones during servicing of a plurality of different types of physical assets in order to minimizing service times and maximize the number of physical assets that can be serviced.

Embodiments of the present disclosure leverage the use of AI-enabled systems and digital twin models to predictively automate configurations of modular service zones equipped for repairing and/or maintaining physical assets within a service center. The automated configurations of the service zones maximize reuse of the modular service zones to service one or more different types of physical assets and limit the number of rearrangements to the service zones between the different types of assets being serviced. Embodiments of physical assets may create a service request for a particular physical asset. The request may be sent to a repairing service or other type of application or program which can proactively evaluate a digital twin model and system data corresponding to the physical asset. The repairing service can identify the types of services (such as maintenance or repairs) that may be required, an estimated timing for completing the services, along with any tools, machines, spare parts, components or any other accessories that may be needed to conduct the performance of the services identified. Based on the analysis conducted by the repairing service, the repairing service may identify a service center capable of performing services on the physical asset. A portion of the service center, referred to herein as modular service zone (or "service zone" for short) can be further identified as an acceptable place within the service center where services can be rendered. Each identified service zone may already be equipped and previously arranged with the parts, machines, tools and/or components for conducting the services, Alternatively, the modular service zone may be a location within the service center that may have each of the parts, tools, equipment and/or other components reasonably available for arrangement therein but may require at least some amount of reconfiguration to be readily equipped with the tools, parts, and machines to perform a service.

Embodiments of an AI-enabled repairing service application or program may apply one or more classification algorithms to the services identified as applicable to physical assets submitting service requests. Classification of the services applicable to the physical asset may indicate the type of spare parts, machines, tools or other components that may assembled or positioned within the modular service zone before the arrival of the physical asset at the service center in order to perform the service. The repairing service or application classifying the services of the physical assets may map the services to the corresponding parts, equipment, tools, components, etc., as part of creating a maintenance profile for each physical asset. Maintenance profiles can be compared by the repairing service to identify commonalities between different services scheduled to be applied to one or more physical assts. Based on commonalities between the different mappings for each service, as well as estimated arrival times of the incoming physical assets to the service center, the repairing service can coordinate and arrange a workflow scheduling the incoming physical assets receiving the various services to one or more different service zones in an sequence that optimizes aggregated servicing time for the plurality of physical assets receiving services.

Based on the sequence of the workflow, taking into account arrival times of the physical assets needing service and the overlap between the parts, tools, machines, etc. required for the physical assets being assigned to various service zones, the repairing service may coordinate robotic systems positioned within the service center by instructing the robotic systems to configure, arrange or re-arrange one or more of service zones in accordance with the workflow. Configurations and arrangements by robotic systems may anticipate the next physical asset scheduled to receive service within a designated service zone, and may pre-place tools, parts, equipment, machinery, components, etc. within the service zone in anticipation of the next physical asset. Pre-placement of tools, machinery, equipment, and other components within the service zones minimize waiting time between services performed within a service zone and maximize the number of physical assets that can be serviced within a period of time. Moreover, by optimizing the workflow to schedule physical assets services having a threshold amount of commonality among the tools, machinery, equipment, etc., the repairing service can reduce the amount of rearrangement needed to service zone between the sequence of different physical arriving at the scheduled service zone for service.

For example, the workflow generated by the repairing service may schedule physical assets to be serviced within the same service zone where the physical assets are the same type of asset, and/or the assets being repaired sequentially share similar servicing features within their maintenance profile, allowing for the services applied to one or more physical assets within the same service zone to use the same types of tools, machines, equipment or know-how to conduct the service without having to conduct a rearrangement of the service zone by one or more robotic systems between execution of the services on the different assets. Upon completion of a service applied to a first physical asset and in anticipation of the next physical asset arriving at the modular service zone, the robotic system can add additional tools, parts, machines or other components to the service zone, that may not have applied to the first physical asset, while also removing any tools, machines, equipment or other components that do not apply to the services being applied to the next physical asset set to arrive for service based on the workflow prepared by the repairing service application coordinating the services for each modular service zone.

Computing System

Various aspects of the present disclosure are described by narrative text, flowcharts, block diagrams of computer systems and/or block diagrams of the machine logic included in computer program product (CPP) embodiments. With respect to any flowcharts (depending upon the technology involved) the operations can be performed in a different order than what is shown in the flowchart. For example, two operations shown in successive flowchart blocks may be performed in reverse order, as a single integrated step, concurrently, or in a manner at least partially overlapping in time. A computer program product embodiment ("CPP embodiment") is a term used in the present disclosure that may describe any set of one or more storage media (or "mediums") collectively included in a set of one or more storage devices. The storage media may collectively include machine readable code corresponding to instructions and/or data for performing computer operations. A "storage device" may refer to any tangible hardware or device that can retain and store instructions for use by a computer processor. Without limitation, the computer readable storage medium may include an electronic storage medium, a magnetic storage medium, an optical storage medium, an electromagnetic storage medium, a semiconductor storage medium, a mechanical storage medium, and/or any combination thereof. Some known types of storage devices that include mediums referenced herein may include a diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination thereof. A computer-readable storage medium should not be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As understood by those skilled in the art, data is typically moved at some occasional points in time during normal operations of a storage device, such as during access, de-fragmentation or garbage collection, but this does not render the storage device as transitory because the data is not transitory while it is stored.

FIG. 1 illustrates a block diagram describing an embodiment of a computing system 101 within in a computing environment, which may be a simplified example of a computing device (i.e., a physical bare metal system and/or a virtual system) capable of performing the computing operations described herein. Computing system 101 may be representative of the one or more computing systems or devices implemented in accordance with the embodiments of the present disclosure and further described below in detail. It should be appreciated that FIG. 1 provides only an illustration of one implementation of a computing system 101 and does not imply any limitations regarding the environments in which different embodiments may be implemented. In general, the components illustrated in FIG. 1 may be representative of an electronic device, either physical or virtualized, capable of executing machine-readable program instructions.

Embodiments of computing system 101 may take the form of a desktop computer, laptop computer, tablet computer, smart phone, smart watch or other wearable computer, mainframe computer, server, quantum computer, a non-conventional computer system such as an autonomous vehicle or home appliance, or any other form of computer or mobile device now known or to be developed in the future that is capable of running an application 150, accessing a network 102 or querying a database, such as remote database 130. Performance of a computer-implemented method executed by a computing system 101 may be distributed among multiple computers and/or between multiple locations. Computing system 101 may be located as part of a cloud network, even though it is not shown within a cloud in FIGS. 1-2. Moreover, computing system 101 is not required to be in a cloud network except to any extent as may be affirmatively indicated.

Processor set 110 includes one, or more, computer processors of any type now known or to be developed in the future. Processing circuitry 120 may be distributed over multiple packages. For example, multiple, coordinated integrated circuit chips. Processing circuitry 120 may implement multiple processor threads and/or multiple processor cores. Cache 121 may refer to memory that is located on the processor chip package(s) and/or may be used for data or code that can be made available for rapid access by the threads or cores running on processor set 110. Cache 121 memories can be organized into multiple levels depending upon relative proximity to the processing circuitry 120. Alternatively, some, or all of cache 121 of processor set 110 may be located "off chip." In some computing environments, processor set 110 may be designed for working with qubits and performing quantum computing.

Figure 4:
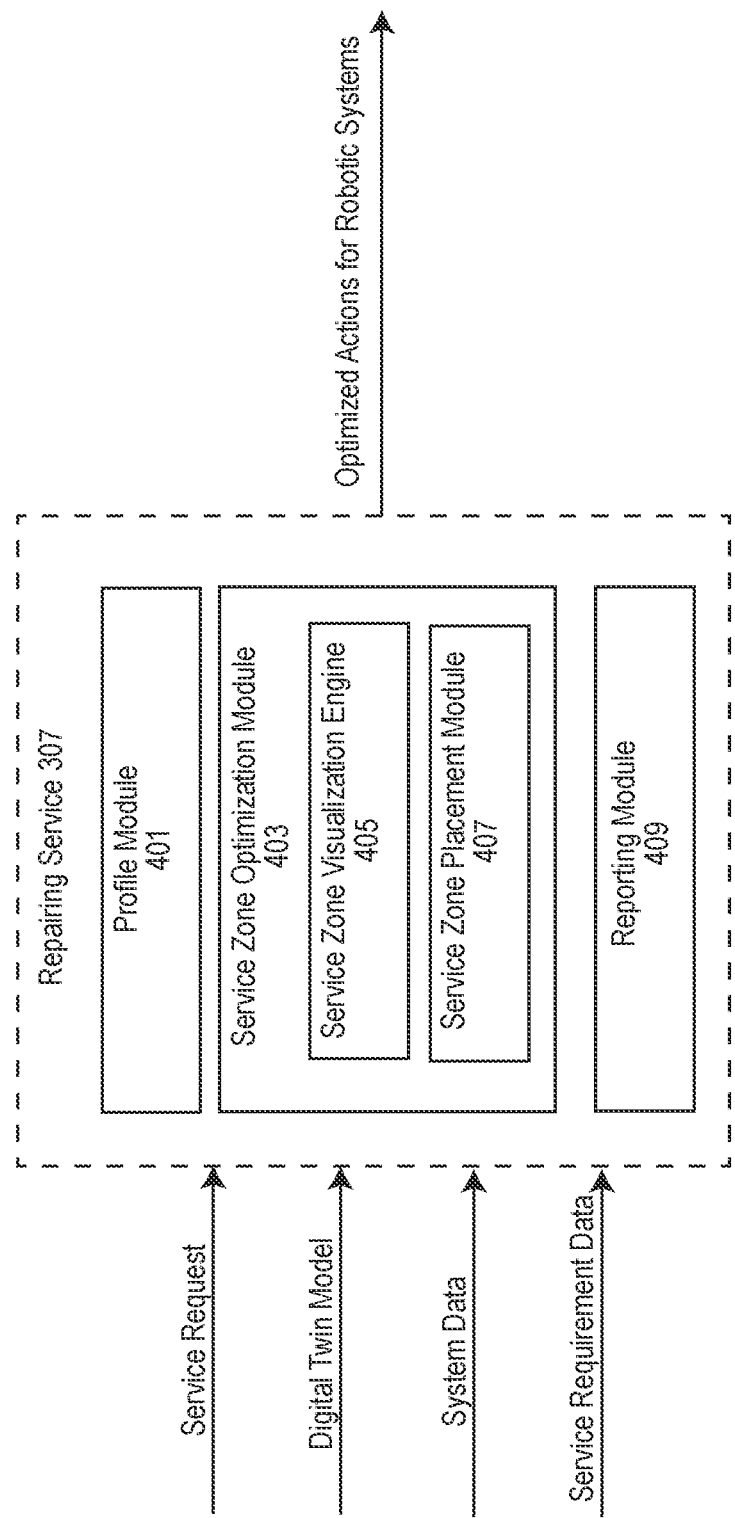
FIG. 4 depicts a block diagram of an exemplary embodiment of a vehicle repairing service executing program code enabling a predictively automated configuration of modular service zones for repairing and maintaining physical assets, in accordance with the present disclosure.

Computer readable program instructions can be loaded onto computing system 101 to cause a series of operational steps to be performed by processor set 110 of computing system 101 and thereby implement a computer-implemented method. Execution of the instructions can instantiate the methods specified in flowcharts and/or narrative descriptions of computer-implemented methods included in this specification (collectively referred to as "the inventive methods"). The computer readable program instructions can be stored in various types of computer readable storage media, such as cache 121 and the other storage media discussed herein. The program instructions, and associated data, can be accessed by processor set 110 to control and direct performance of the inventive methods. In computing environments of FIGS. 1-2, at least some of the instructions for performing the inventive methods may be stored in persistent storage 113, volatile memory 112, and/or cache 121, as application (s) 150 comprising one or more running processes, services, programs and installed components thereof. For example, program instructions, processes, services and installed components thereof may include repairing service 307 comprising components such as profile module 401, service zone optimization module 403 and/or reporting module 409, and sub-components thereof as shown in FIG. 4.

Communication fabric 111 may refer to signal conduction paths that may allow the various components of computing system 101 to communicate with each other. For example, communications fabric 111 can provide for electronic communication among the processor set 110, volatile memory 112, persistent storage 113, peripheral device set 114 and/or network module 115. Communication fabric 111 can be made of switches and/or electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 may refer to any type of volatile memory now known or to be developed in the future, and may be characterized by random access, but this is not required unless affirmatively indicated. Examples include dynamic type random access memory (RAM) or static type RAM. In computing system 101, the volatile memory 112 is located in a single package and can be internal to computing system 101, but, alternatively or additionally, the volatile memory 112 may be distributed over multiple packages and/or located externally with respect to computing system 101. Application 150, along with any program(s), processes, services, and installed components thereof, described herein, may be stored in volatile memory 112 and/or persistent storage 113 for execution and/or access by one or more of the respective processor sets 110 of the computing system 101.

Persistent storage 113 can be any form of non-volatile storage for computers that may be currently known or developed in the future. The non-volatility of this storage means that the stored data may be maintained regardless of whether power is being supplied to computing system 101 and/or directly to persistent storage 113. Persistent storage 113 may be a read only memory (ROM), however, at least a portion of the persistent storage 113 may allow writing of data, deletion of data and/or re-writing of data. Some forms of persistent storage 113 may include magnetic disks, solid-state storage devices, hard drives, flash-based memory, erasable read-only memories (EPROM) and semi-conductor storage devices. Operating system 122 may take several forms, such as various known proprietary operating systems or open-source Portable Operating System Interface type operating systems that employ a kernel.

Peripheral device set 114 includes one or more peripheral devices connected to computing system 101. For example, via an input/output (I/O interface). Data communication connections between the peripheral devices and the other components of computing system 101 may be implemented using various methods. For example, through connections using Bluetooth, Near-Field Communication (NFC), wired connections or cables (such as universal serial bus (USB) type cables), insertion type connections (for example, secure digital (SD) card), connections made though local area communication networks and/or wide area networks such as the internet. In various embodiments, UI device set 123 may include components such as a display screen, speaker, microphone, wearable devices (such as goggles, headsets and smart watches), keyboard, mouse, printer, touchpad, game controllers, and haptic feedback devices. Storage 124 can include external storage, such as an external hard drive, or insertable storage, such as an SD card. Storage 124 may be persistent and/or volatile. In some embodiments, storage 124 may take the form of a quantum computing storage device for storing data in the form of qubits. In some embodiments, networks of computing systems 101 may utilize clustered computing and components acting as a single pool of seamless resources when accessed through a network by one or more computing systems 101. For example, a storage area network (SAN) that is shared by multiple, geographically distributed computer systems 101 or network-attached storage (NAS) applications. IoT sensor set 125 can be made up of sensors that can be used in Internet-of-Things applications. For example, a sensor may be a temperature sensor, motion sensor, infrared sensor or any other type of known sensor type.

Network module 115 may include a collection of computer software, hardware, and/or firmware that allows computing system 101 to communicate with other computer systems through a computer network 102, such as a LAN or WAN. Network module 115 may include hardware, such as modems or Wi-Fi signal transceivers, software for packetizing and/or de-packetizing data for communication network transmission, and/or web browser software for communicating data over the network. In some embodiments, network control functions and network forwarding functions of network module 115 are performed on the same physical hardware device. In other embodiments (for example, embodiments that utilize software-defined networking (SDN)), the control functions and the forwarding functions of network module 115 can be performed on physically separate devices, such that the control functions manage several different network hardware devices. Computer readable program instructions for performing the inventive methods can typically be downloaded to computing system 101 from an external computer or external storage device through a network adapter card or network interface included in network module 115.

Figure 2:
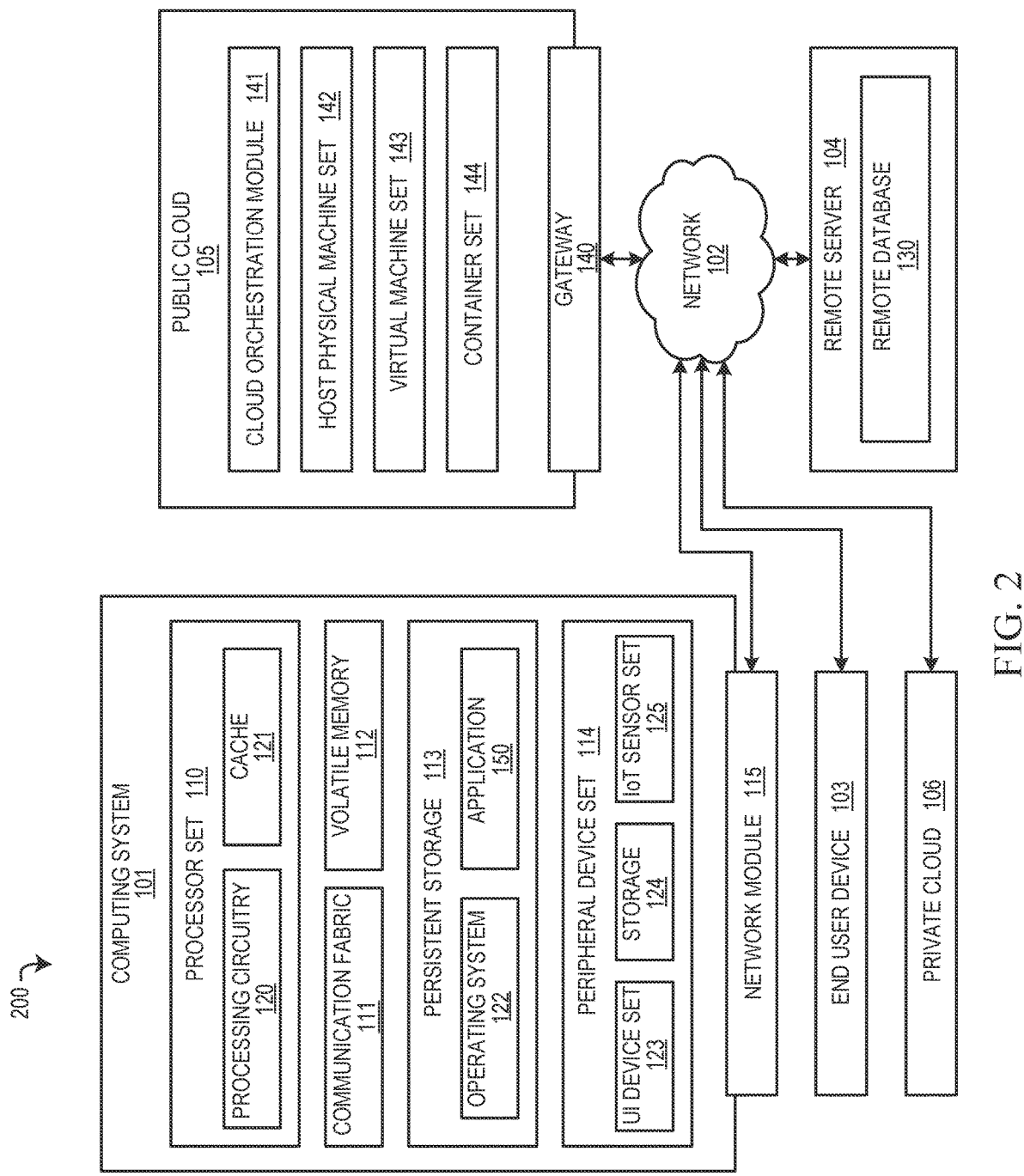
FIG. 2 depicts a block diagram illustrating an extension of the computing system environment of FIG. 1, wherein the computer systems are configured to operate in a network environment (including a cloud environment), and perform methods described herein in accordance with the present disclosure.

FIG. 2 depicts a computing environment 200 which may be an extension of the computing environment 100 of FIG. 1, operating as part of a network. In addition to computing system 101, computing environment 200 can include a computing network 102 such as a wide area network (WAN) (or another type of computer network) connecting computing system 101 to an end user device (EUD) 103, remote server 104, public cloud 105, and/or private cloud 106. In this embodiment, computing system 101 includes processor set 110 (including processing circuitry 120 and cache 121), communication fabric 111, volatile memory 112, persistent storage 113 (including operating system 122 and application(s) 150, as identified above), peripheral device set 114 (including user interface (UI), device set 123, storage 124, Internet of Things (IoT) sensor set 125), and network module 115. Remote server 104 includes remote database 130. Public cloud 105 includes gateway 140, cloud orchestration module 141, host physical machine set 142, virtual machine set 143, and/or container set 144.

Network 102 may be comprised of wired or wireless connections. For example, connections may be comprised of computer hardware such as copper transmission cables, optical transmission fibers, wireless transmission, routers, firewalls, switches, gateway computers and/or edge servers. Network 102 may be described as any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. Other types of networks that can be used to interconnect the various computer systems 101, end user devices 103, remote servers 104, private cloud 106 and/or public cloud 105 may include Wireless Local Area Networks (WLANs), home area network (HAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 101.

End user device 103 can include any computer device that can be used and/or controlled by an end user (for example, a customer of an enterprise that operates computing system 101) and may take any of the forms discussed above in connection with computing system 101. EUD 103 may receive helpful and useful data from the operations of computing system 101. For example, in a hypothetical case where computing system 101 is designed to provide a recommendation to an end user, this recommendation may be communicated from network module 115 of computing system 101 through network 102 to EUD 103. In this example, EUD 103 can display, or otherwise present, the recommendation to an end user. In some embodiments, EUD 103 may be a client device, such as thin client, thick client, mobile computing device such as a smart phone, mainframe computer, desktop computer and so on.

Remote server 104 may be any computing systems that serves at least some data and/or functionality to computing system 101. Remote server 104 may be controlled and used by the same entity that operates computing system 101. Remote server 104 represents the machine(s) that collect and store helpful and useful data for use by other computers, such as computing system 101. For example, in a hypothetical case where computing system 101 is designed and programmed to provide a recommendation based on historical data, the historical data may be provided to computing system 101 from remote database 130 of remote server 104.

Public cloud 105 may be any computing systems available for use by multiple entities that provide on-demand availability of computer system resources and/or other computer capabilities including data storage (cloud storage) and computing power, without direct active management by the user. The direct and active management of the computing resources of public cloud 105 can be performed by the computer hardware and/or software of cloud orchestration module 141. The computing resources provided by public cloud 105 can be implemented by virtual computing environments that run on various computers making up the computers of host physical machine set 142, and/or the universe of physical computers in and/or available to public cloud 105. The virtual computing environments (VCEs) may take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through network 102.

VCEs can be stored as "images." A new active instance of the VCE can be instantiated from the image. Two types of VCEs may include virtual machines and containers. A container is a VCE that uses operating-system-level virtualization, in which the kernel allows the existence of multiple isolated user-space instances, called containers. These isolated user-space instances may behave as physical computers from the point of view of applications 150 running in them. An application 150 running on an operating system 122 can utilize all resources of that computer, such as connected devices, files and folders, network shares, CPU power, and quantifiable hardware capabilities. Applications 150 running inside a container of container set 144 may only use the contents of the container and devices assigned to the container, a feature which may be referred to as containerization.

Private cloud 106 may be similar to public cloud 105, except that the computing resources may only be available for use by a single enterprise. While private cloud 106 is depicted as being in communication with network 102 (such as the Internet), in other embodiments a private cloud 106 may be disconnected from the internet entirely and only accessible through a local/private network. A hybrid cloud may refer to a composition of multiple clouds of different types (for example, private, community or public cloud types), and the plurality of clouds may be implemented or operated by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 may be both part of a larger hybrid cloud environment.

System Predictively Automating Configuration of a Modular Service Zone

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 3:
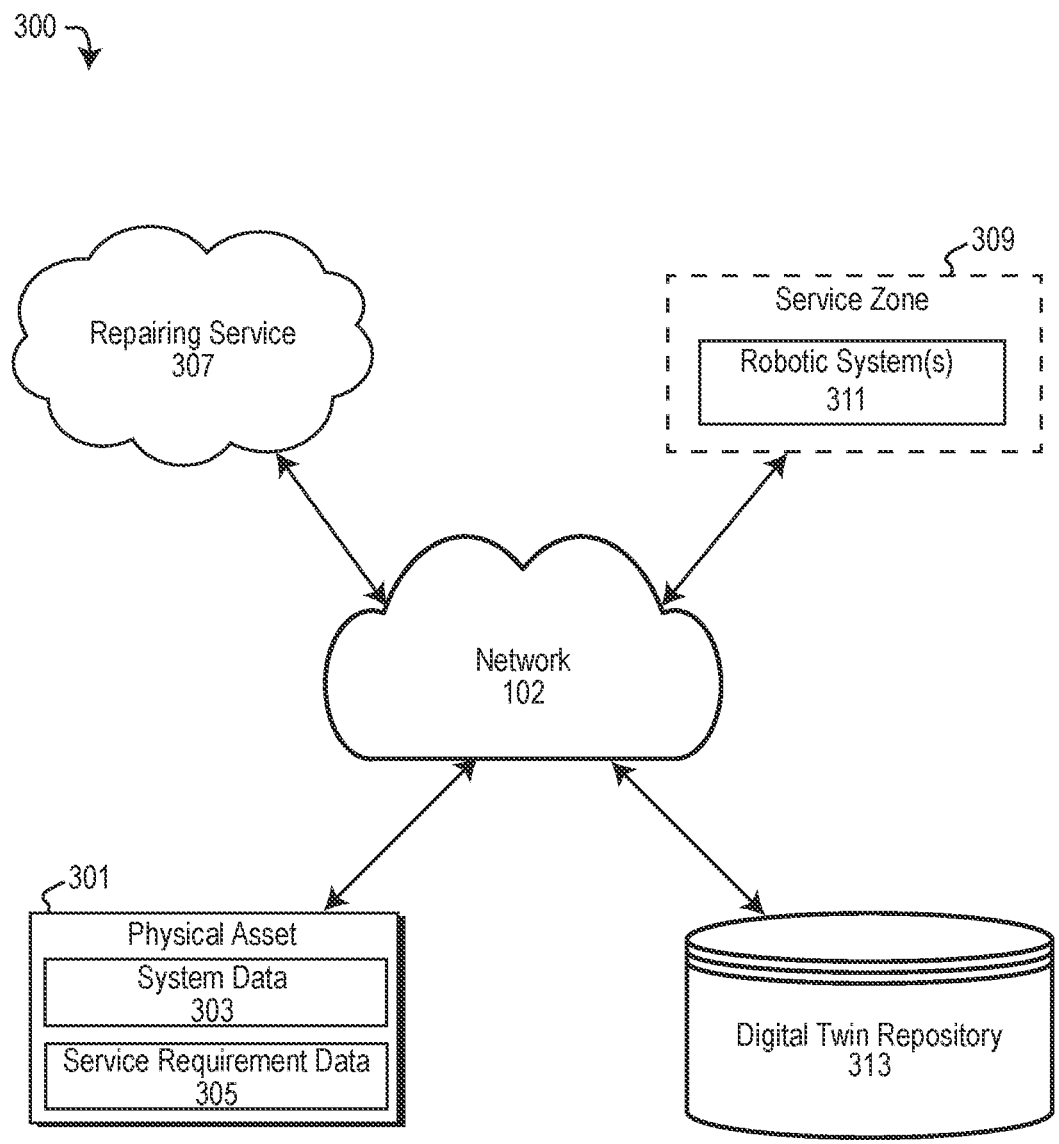
FIG. 3 depicts a functional block diagram describing an embodiment of a computing environment for predictively automating the configuration of modular service zones for repairing and maintaining a plurality of physical assets while maximizing reuse of a modular service zones, minimizing wait time and optimizing aggregate time for performing the services in accordance with the present disclosure.

Referring to the drawings, FIG. 3 depicts an embodiment of a computing environment 300 illustrating a system capable of predictively automating configurations of modular service zones 309 within a service center scheduled to received one or more physical assets 301. The modular service zones 309 may be described as an area within the service center, which can be configured, arranged and/or rearranged (as needed) to provide one or more services, such as repairs, or maintenance on physical assets 301. The embodiments of the computing environment 300 can optimize the scheduling and coordination of services being provided to the physical assets 301 in a manner that reduces the aggregate amount of time for providing services to all physical assets 301 receiving services within a period of time at a service center, while maximizing the number of physical assets 301 serviced within the period of time and minimizing the number of reconfigurations to each of the service zones 309 as each new physical asset 301 arrives for service. As illustrated, the computing environment 300 may comprise one or more physical asset 301, a repairing service 307, a digital twin repository 313, one or more robotic systems 311 which may be positioned and movable within or between service zones 309. Embodiments of the physical asset(s) 301, repairing service 307, robotic system(s) 311, and digital twin repository may be placed in communication with one another via a computing network 102.

Embodiments of physical assets 301 may be any type of physical device, machine, or apparatus, equipment, hardware, etc., which may be capable of connecting and communicating data over network 102. For example, in the exemplary embodiment, a physical asset 301 may be a vehicle, including (but not limited to) autonomous or semi-autonomous automobiles, aircraft, locomotives, turbines, boats, ships, etc. In other embodiments, physical assets 301 may include devices, machinery or apparatuses such as medical machinery or equipment, oil and gas-powered equipment, mobile communication devices such as smartphones, home appliances or other smart devices. Physical asset 301 may be equipped with or tracked by one or more types of sensors and/or IoT devices onboard the physical asset 301 in some embodiments. In other embodiments, the sensors and/or IoT devices monitoring the physical asset 301 may be positioned in or around the environments surrounding the physical asset 301. The sensors and IoT devices, whether onboard the physical asset 301 or positioned within the surrounding environment, may measure one or more functions and health of the physical asset 301, and may be responsible for the collection of data describing the current state of physical asset 301 (i.e., in real time). The collected data describing the physical asset 301 may be stored as part of a system log and may include location data describing the physical location of the physical asset 301.

The data collected from the sensors, IoT devices, and/or other data sources, describing the physical asset 301, may be stored as system data 303. The system data 303 collected from the plurality of onboard or nearby sensors and IoT devices of the physical asset 301, may be used to construct a digital twin model of the physical asset 301. Embodiments of the digital twin model may depict a virtual representation of the physical asset 301 in the physical asset's current state based on the system data 303 that has been collected by the systems of the physical asset 301. Moreover, as the system data 303 changes over time to reflect changes in the current state of the physical asset 301 (i.e., as measured by the sensors, IoT devices, etc.), the digital twin model may be updated simultaneously (or near simultaneously) to reflect the changes virtually within the digital twin model. Digital twin models may be organized and stored locally within persistent storage 113, which may be onboard the physical asset 301 or, in some embodiments, the digital twin models of the physical asset 301 may be stored on a network-accessible storage device, such as the digital twin repository 313.

Embodiments of physical assets 301 may self-assess the current status and/or condition of the physical asset 301. Self-assessment(s) of a physical asset 301 may detect one or more problems, malfunctions, errors, or other needs of the physical asset 301, and may determine whether or not the physical asset 301 requires maintenance, repairs or other services in order to maintain optimal operations and/or return the physical asset 301 to an optimal operational state. Self-assessment by one or more systems of the physical asset 301 may occur periodically at a regularly scheduled interval of time, may be triggered in response to changes in the current state of physical asset 301, manually selected for performance by a user, owner or administrator of the physical asset 301, in response to detectable errors, non-operational features or functions of the physical asset, and/or upon detection of features of the physical asset 301 not operating in an optimal manner.

Self-assessment of a physical asset 301 may be conducted by scanning or testing systems of physical asset 301 and/or analyzing system data 303 collected by the IoT devices and sensors of the physical asset 301. An AI-enabled algorithm connected to the physical asset 301 may be trained to identify potential issues with the physical asset 301 that may need to be repaired or can be mitigated by maintenance. Results of the self-assessment of the physical asset 301 can be logged to a log file of the system data 303. If, upon a self-assessment of the physical asset 301 or a manual assessment by a user, owner, administrator, etc. of the physical asset 301, it is determined that repairs or maintenance should be further explored or conducted, physical asset 301 may document potential issues or needs of the physical asset 301, including maintenance and/or repairs identified by the output of the self-assessment, as part of service requirement data 305. Physical assets 301 may generate a service request and transmit the service request, alongside system data 303, service requirement data 305 and/or the digital twin model to a repairing service 307.

Embodiments of repairing service 307 may be part of an application 150 or program accessible to the physical asset 301 via network 102. The repairing service 307 may be running as an instance on a service provider's cloud network, or any other type of network described here. Embodiments of the repairing service 307 may perform functions and processes associated with assessing digital twin models of physical assets 301 and the associated system data 303 in order to identify the types of services to provide physical assets 301 as well as any tools, equipment, machines, parts, accessories and/or components that may be known or used to conduct the types of services identified for the physical asset 301. Moreover, based on the types of services identified, embodiments of the repairing service may organize workflow and scheduling of physical assets 301 at an appropriate service center capable of conducting the performance of the services, optimize the arrangement of service zones 309 within a selected service center, and schedule performance of services for the physical assets 301 with the service center in accordance with the generated workflow. Scheduling the performance of one or more services with a service center can be performed in accordance with optimal workflow generated by the repairing service based on the overlap of commonalities between the physical assets 301 requesting services and are assignable to the same service center. The schedule for conducting services in accordance with the workflow may be arranged in a manner that minimizes wait times for the completion of the services, minimizes rearrangement of the service zones 309 between performance of services for different physical assets 301 and maximizes the number of physical assets 301 receiving services within a service zone 309 during a selected period of time.

Referring to the drawing of FIG. 4, embodiments of repairing service 307 may include one or more modules or sub-components responsible for implementing one or more specific processes, tasks, functions or features of the repairing service 307. The term "module" may refer to a hardware module, software module, or a module may be a combination of hardware and software resources. A module (whether hardware, software or a combination thereof) may be designed to implement or execute one or more specific tasks, routines and/or functions. Embodiments of hardware-based modules may include self-contained components such as chipsets, specialized circuitry, processor sets 110, one or more volatile memory 112 devices and/or persistent storage 113. A software-based module may be part of an application 150, program code or linked to program code comprising a set of specific programmed instructions loaded into a volatile memory 112 or persistent storage 113. In the exemplary embodiment of FIG. 4, repairing service 307 may comprise a profile module 401, a service zone optimization module 403 and/or a reporting module 409.

Embodiments of profile module 401 may perform tasks, functions and/or processes of the repairing service 307 directed toward creating a maintenance profile of each physical asset 301 interfacing with the repairing service 307 via network 102. For example, interfacing with the repairing service 307 may occur by submitting a service request, digital twin model, system data 303 and/or service requirement data 305 to the repairing service 307 for analysis and scheduling of one or more services. Embodiments of the profile module 401 may evaluate the digital twin model of the physical asset 301 and identify, in conjunction with the system data 303 and/or service requirement data 305 submitted alongside the digital twin model, which types of repairs, maintenance or other services may be provided (or should be provided) for the physical asset 301, as well as any associated machines, tools, spare parts, components or other accessories that are known to be used for conducting the services available for physical asset 301. As part of the maintenance profile being created by the profile module 401, embodiments of the profile module 401 may create a mapping between the types of services identified in association with the physical asset 301 and the corresponding types of equipment, machines, parts, components or other accessories used to implement the services associated with the maintenance profile of each physical asset 301. Comparisons between maintenance profiles of physical assets 301 may allow for comparisons between requirements for conducting services of physical assets 301 and/or classifications of the physical assets' 301 maintenance profiles to determine commonalities between the different services that may be performed.

Embodiments of profile module 401 may apply one or more classification algorithms to the maintenance profiles being created by the profile module 401 using the digital twin model for each physical asset 301. Application of one or more classification algorithms to the maintenance profiles of the plurality of physical assets 301 may allow the profile module 401 to identify commonalities between the services that are applicable to each of the physical assets 301, including commonalities between the types of machines, tools, equipment, components or other accessories that may be mapped to the each of the services applicable to a physical asset 301. For example, if a profile module 401 is classifying digital twin models for a plurality of vehicles (which may be autonomous or not), these vehicles may have several potential services within their maintenance profile with commonalities between them despite being different types or brands of vehicles. For instance, if two vehicles require tire-related services, such as a tire rotation and balancing for a first vehicle and tire replacement for the second vehicle, the profile module 401 may determine the types of tools, machinery, equipment and parts that may be in common between the tire rotation service and tire replacement services being performed. Profile module 401 may identify the commonalities between the tire rotation service and the tire replacement service, such as the need for the use of a vehicle lift, pneumatic or manual wrench, lug nuts, wheel balancer, etc., allowing the repairing service 307 to identify a service center capable of performing both tire rotation and tire replacement services and, if arrival times at the service center would be within a threshold period of time, the repairing service may schedule performance of the tire services for the first physical asset and the second physical asset successively within a workflow, allowing for a service zone 309 to maintain the tools, equipment, machines, components, etc. that are in common between the two services while minimizing the amount of changes to the service zone 309 in between performing services on both of the physical assets 301.

Embodiments of service zone optimization module 403 may perform functions, tasks and processes of the repairing service 307 associated with identifying service centers capable of conducting services for the physical assets 301 and, based on the classifications of the maintenance profiles for each of the physical assets 301, the location of the physical assets 301 and the expected arrival times of physical assets 301 at a designated service center, creating a workflow implementing a sequence of services within one or more service zones 309 of each service center. Moreover, service zone optimization module 403 may also implement the generated workflows within the service center by instructing robotic systems 311 positioned within the service zone 309 to prepare the service zones 309 in accordance with the sequence of services being performed on one or more physical assets 301 scheduled with the service center. For each incoming service request, the associated services identified and classified via the profile module 401, embodiments of service zone optimization module 403 may identify whether or not an existing service zone 309 within a service center can accommodate the services for the physical asset's service request. If existing service zones 309 are not currently equipped to accommodate the services within the workflow, identifying which service zones of a service center may accommodate performance of the services with a minimal number of modifications to an existing service zone 309. For example, identifying service zones 309 which may be acceptable after a minimal number of changes or rearrangements to the tools, equipment, components and other accessories that may be present within the identified service zone 309, in order to provide one or more of the services identified by the profile module 401.

Embodiments of the service zone optimization module 403 may create a workflow for scheduling the various incoming physical assets 301 arriving at the service center and organizing the order in which physical assets 301 are assigned to one or more service zones 309 for the execution of the requested services, based on the services being received and the commonality among the types of machines, tools, parts, components or other accessories associated with the service as indicated by the maintenance profile of the physical asset 301. As part of the workflow generation and scheduling process, the service zone optimization module 403 may calculate and consider an estimated time of arrival for each incoming physical asset 301 to arrive at the service center. Service zone optimization module 403 may use location data provided to the repairing service 307 as part of the system data 303 to estimate arrival times. Moreover, in some embodiments, service zone optimization module 403 may further consider when creating a workflow and assigning physical assets 301 to a service zone, the amount of time to configure or rearrange a service zone 309 with the equipment, tools, parts, components, etc., to provide the requested services, as well as timing for receiving various parts or components that may not be immediately accessible within the service center or may be scheduled for use at another service zone 309 within the service center. For example, time constraints may be considered when scheduling physical assets and creating the workflow to accommodate for a service center that needs to acquire parts or tools from another location or from a parts supplier in order to conduct the service.

Embodiments of the service zone optimization module 403 may generate a workflow having optimum timing and schedule the performance of the services at the service center within the service zones 309 in accordance with the optimum timing of the generated workflow. The workflow may include instructions and/or events assigning physical assets 301 in a sequenced order to one or more service zones 309, steps for rearranging or configuring the each of the designated service zones 309 with the tools, equipment, machines, components, parts, etc. mapped to the services being rendered on a corresponding physical asset 301 ahead of the arrival of the physical asset 301 at the designated service zone 309 and instructions or steps for reconfiguring or re-arranging service zones 309 following completion of service on a physical asset 301, in anticipation of the arrival of the next physical asset 301 within the service zone 309. The workflow generated by the service zone optimization module 403 may schedule the sequential order of physical asset assignments to the service zones 309 in a manner that optimizes timing for completing services, minimizes the timing associated with rearranging a service zone 309, minimizing waiting times between services being completed and maximizing the number of physical assets 301 may be receiving services within the service zones 309 of the service center. For example, by sequencing an order of physical assets 301 being assigned to the same service zone 309 when the maintenance profiles of the physical assets 301 being assigned to the same service zone 309 have a threshold number of commonalities between the types of machines, tools, equipment, parts, components or other accessories utilized during the implementation of the services. By sequentially scheduling physical asset services being applied to different physical assets with a shared number of commonalities above a threshold number to the same service zones 309, a minimal number of alterations to the configuration of the service zone may be needed between performance of the services, thus maximizing the amount of physical assets 301 that may be receiving services through a service zone within a period of time.

Embodiments of service zone optimization module 403 may implement the generated workflow to configure and arrange the sequence of services within a service center at one or more designated service zones 309 by outputting one or more instructions to a robotic system 311 positioned within the service center. The robotic systems 311 may be instructed how to configure and arrange each of the service zones 309 in anticipation of the arrival of physical assets 301 at the service center and/or in anticipation of the next physical asset 301 being placed within a service zone 309 to receive one or more services. Robotic systems 311 may move autonomously throughout the service center and, based on the instructions provided to the robotic systems 311 consistent with the workflow generated by the repairing service 307, arrange each of the designated service zones 309. Robotic systems 311 may move throughout the service center, gathering tools, moving equipment, collecting parts and/or components or other accessories for providing services within the service zones 309 and placing the gathered tools, equipment, parts, etc., within the designated service zone 309. Ensuring that the proper tools, equipment and parts for performing the services on the physical asset 301 are present and within a reasonable distance from the individuals or machines responsible for implementing the service within the service zone 309. Upon conclusion of services for a first sequenced asset within one or more service zones 309, robotic systems 311 may, consistent with the workflow and scheduling of services, rearrange the service zone 309 as instructed, including adding additional equipment, tools and parts for providing services to the next asset in the workflow sequence within the service zone 309. Robotic system 311 may also remove equipment, tools, components and/or unused parts from the service zone 309 that are not part of the servicing needs for performing services on the physical asset being serviced next within the service zone 309. Tools, equipment, parts and other components removed from a service zone 309 may be brought to another service zone 309 by the robotic system 311 and/or placed in a neutral staging or storage area outside of the various service zones 309 established within the service center.

Embodiments of the service zone optimization module 403 may include additional components which may assist the service zone optimization module 403 with generating an optimized workflow and sequencing of the services being provided to one or more physical assets 301. For example, in the embodiment of the service zone optimization module 403 of the FIG. 4, a service zone visualization engine 405 and/or a service zone placement module 407 may be available. Embodiments of the service zone visualization engine 405 may perform tasks, functions, and processes allowing the repairing service 307 to visualize the layout of the service centers, the spaces available for creating service zones within the service center and the locations of various equipment, tools and machinery within each of the available services centers. A service zone placement module 407 may utilize the service zone visualization engine 405 to simulate workflows created by the service zone optimization module, and ultimately identify the optimal workflow to implement. Using the service zone placement module 407 in conjunction with the service zone visualization engine 405, embodiments of the repairing service 307 can simulate various permutations of the workflow by simulating the assignment of machines, equipment tools, parts, etc. and a sequence of physical assets 301 to various service zones 309 represented by the visualization engine. The service zone placement module 407 may calculate and identify the optimal schedule for assigning incoming physical assets 301 to the different service zones 309 and the scheduled sequence that may be predicted to yield the maximum aggregate number of physical assets 301 serviced within a threshold period of time, the minimum number of reconfigurations of a service zone 309 between scheduled physical assets 301 being serviced sequentially within the same service zone 309, the minimum amount of wait time for receiving services. Based on the simulated workflow achieving the optimal results, the optimal workflow can be selected by the service zone optimization module 403 and instructions for implementing the optimal workflow can be transmitted to the robotic system(s) 311 positioned within the service center.

Embodiments of repairing service 307 may include a reporting module 409. The reporting module 409 may perform functions, processes and/or tasks of the repairing service 307 which may be directed toward outputting communications and reporting information to physical assets 301 submitting requests to the repairing service 307. For example, reporting module 409 may report back to the physical asset 301 and users or owners thereof, the type services scheduled for the physical asset 301, the location of the service center conducting the services, an estimated date and time the services are being conducted, and any additional recommended services the user may want to schedule for the physical asset 301. Embodiments of the reporting module 409 may further communicate with the service center. For example, reporting module 409 may confirm scheduled service appointments or cancellation of services for each of the physical assets 301, as well as confirm arrivals of the physical assets 301 with the service center. Output from the reporting module 409 may be in any form of electronic communication that may be sent over network 102. For example, reports, notifications and other messages being sent from the reporting module 409 may be in the form of an email, push message, text message, notification, alerts, or any other known type of electronic communication format or delivery system.

Method for Predictively Automating Configuration of a Modular Service Zone

Figure 5:
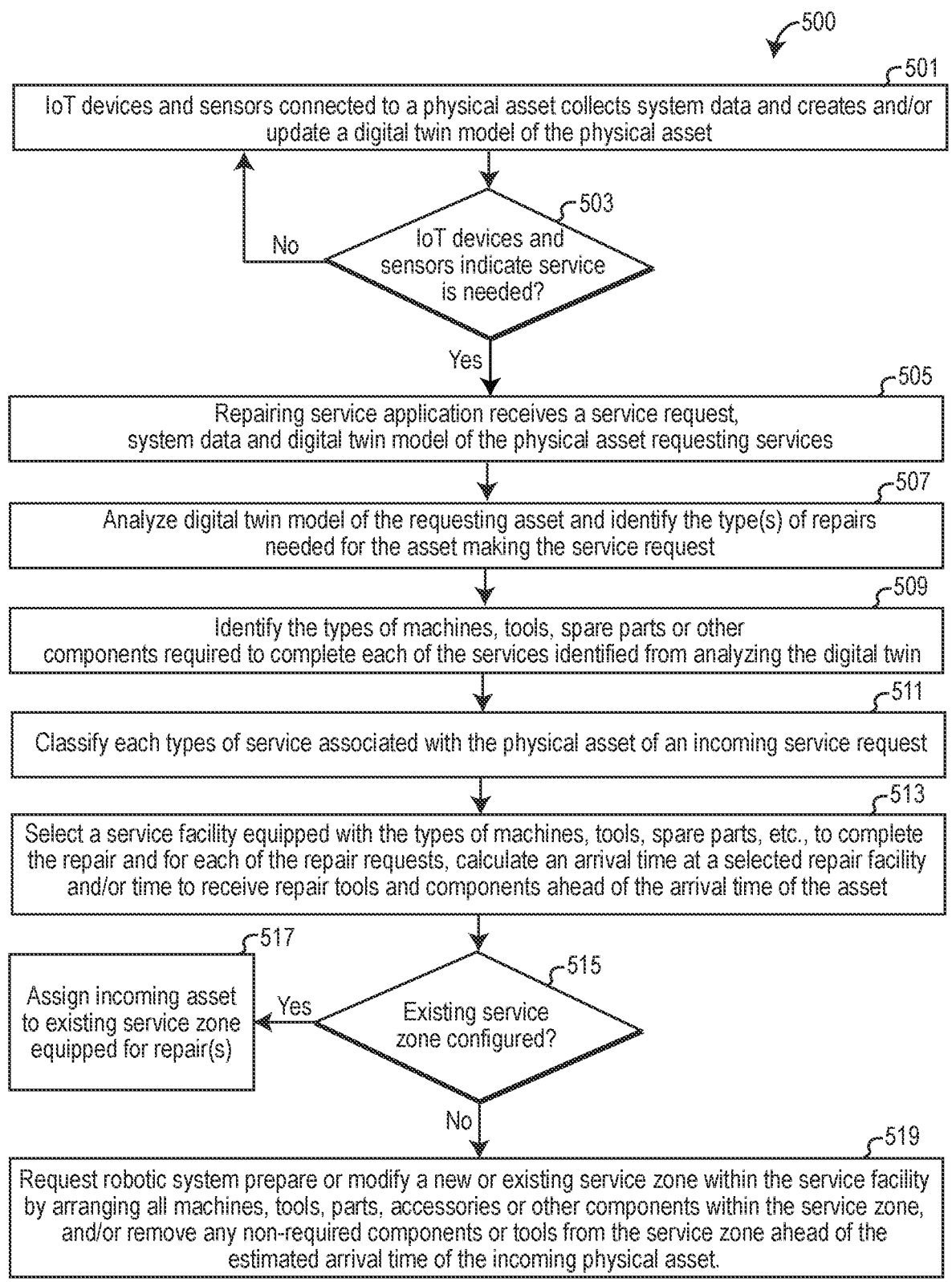
FIG. 5 depicts a flow diagram describing an embodiment of a computer-implemented method for predictively automating the configuration of modular service zones for repairing and maintaining a plurality of physical assets, in accordance with the present disclosure.
Figure 6:
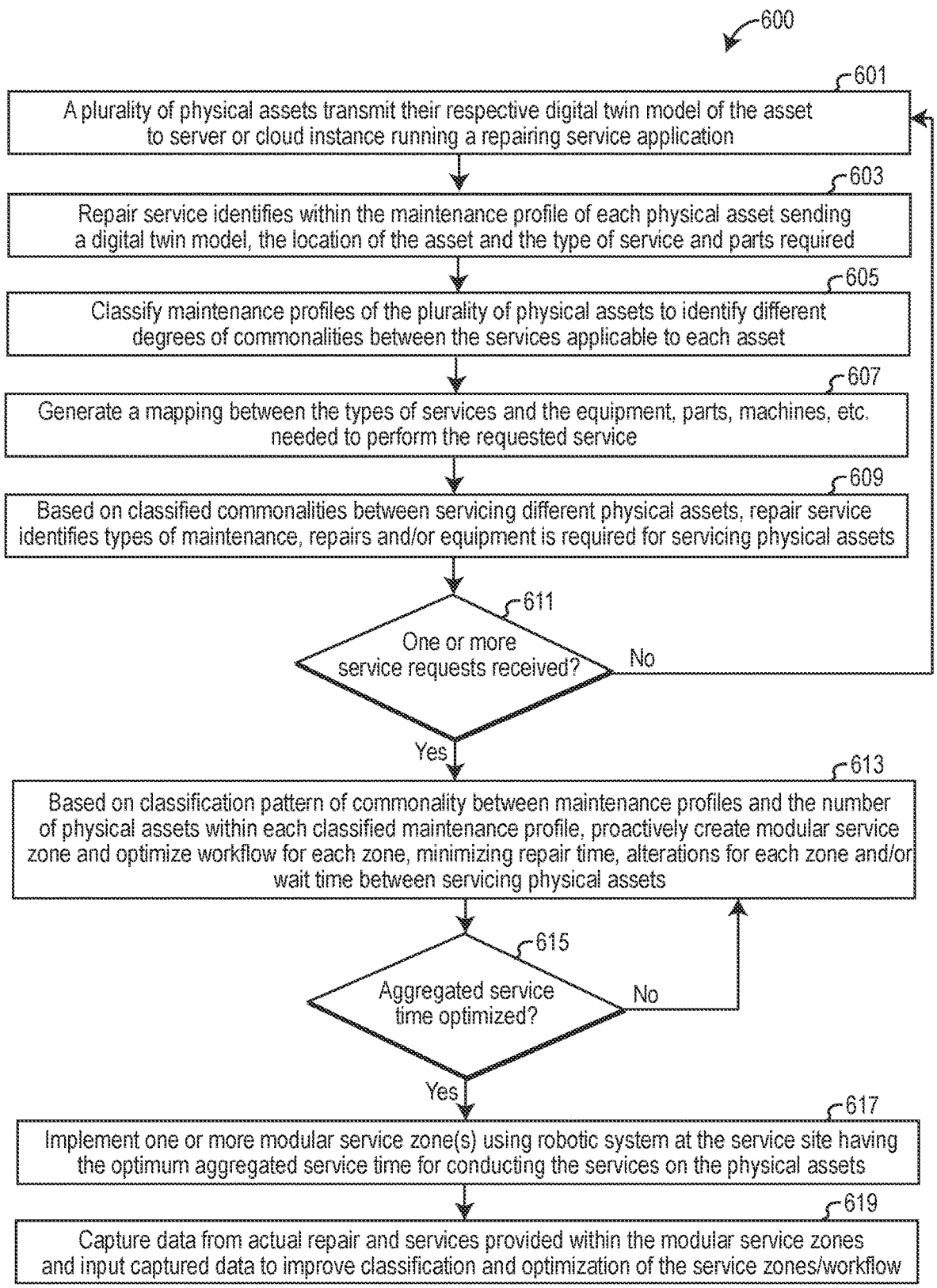
FIG. 6 depicts a flow diagram depicting an embodiment of a computer-implemented method for maximizing reuse of module service zones to repair or maintain physical assets and optimizing aggregated servicing time of the repairs or maintenance of the physical assets within the modular service zones, in accordance with the present disclosure.

The drawings of FIGS. 5-6 represent embodiments of methods 500, 600 for predictively automating configurations of a modular service zone arranged within a service center for providing one or more services to a plurality of physical assets 301 and optimizing the workflow of the modular service zone 309 based on the commonalities among maintenance profiles of the physical assets 301 in order to reuse service zones 309 with minimum alterations, service a maximum number of physical assets 301 within a time period and minimize a total amount of time to service multiple physical assets 301. The embodiments of methods 500, 600 can be implemented in accordance with the computing systems and examples depicted in FIGS. 1-4 above and has described throughout this application. A person skilled in the art should recognize that the steps of the methods 500, 600 described in FIGS. 5-6 may be performed in a different order than presented and may not require all the steps described herein to be performed.

The embodiment of method 500 described by FIG. 5 may begin at step 501. During step 501, IoT devices and/or sensors connected to a physical asset 301, or positioned in the surrounding environment, collect system data 303 of the physical asset 301. Using the collected system data 303, a digital twin model reflecting the current state of the physical asset 301 is created or updated. In step 503, a physical asset 301 may conduct a self-assessment. Based on the self-assessment of the physical asset 301, a determination is made whether one or more services should be performed on the physical asset, taking into account the current state of the physical asset 301 as well as the measurements and outputs of IoT devices and sensors. For example, a determination made be made that the physical asset is not functioning optimally based on sensor data or that errors are being identified during self-assessment and thus one or more maintenance services or repairs may be needed to correct the error. If in step 503, the system data 303 indicates that one or more services should be conducted on the physical asset 301, the method 500 may proceed to step 505, otherwise, method 500 may return to step 501 wherein IoT devices and/or sensors may continue to collect system data 303 and keep the digital twin model up-to-date with the latest performance data of physical asset 301. In response to identifying that one or more services may be needed on the physical asset 301, computing systems onboard or connected to the physical asset 301 may transmit a service request to a repairing service or application, such as repairing service 307, which may be hosted on a public or private cloud and/or any other type of network 102.

In step 505, the repairing service 307 hosted by the cloud may receive a service request from a physical asset 301. Accompanying the service request, additional information about the physical asset 301 may be provided, including system data 303 of physical asset 301 and/or a digital twin model of the physical asset 301 requesting services. In step 507, the digital twin model of the physical asset 301 is analyzed repairing service 307 for suitable services that may be applicable to the physical asset, based on the current status of the digital twin model and the system data 303. The repairing service 307 may identify one or more services, including repairs and/or maintenance that is applicable to the physical asset 301 in order to keep the asset running at optimal performance and/or may fix ongoing errors and performance issues experienced or exemplified by the digital twin model.

In step 509, the instance of the repairing service 307 may identify the types of machines, tools, spare parts and/or other components associated with the identified repairs, maintenance or other services based on the analysis of the digital twin model. In step 511, each type of service applicable to the physical asset 301 can be classified by the repairing service 307. A maintenance profile may include a plurality of potentially available services for each physical asset 301 using the repairing service 307, allowing for comparisons between physical assets 301 to be made based on maintenance profiles. The comparisons between physical asset 301 maintenance profiles can identify commonalities between the services for each of the physical assets 301, including (but not limited to) commonalities between the types of machines, tools, equipment, components, parts or other accessories needed for repairs, maintenance or other services. By identifying commonalities between the services available for each of the physical assets 301, the repairing service 307 can schedule and coordinate physical asset services into assigned modular service zones 309, whereby scheduled services requiring similar types of needs for machines, tools, parts, knowhow, and other components can be performed sequentially within the same service zones 309, within adjacent service zones 309 and/or nearby service zones 309. Allowing for common tools, machines, equipment and other components to be readily shareable between scheduled services and/or between the service zones 309, reducing the amount of reconfiguration or rearrangement of the service zones 309.

In step 513, the repairing service 307 may select a service center facility that is either known to be equipped with the machines, tools, parts, etc. for completing one or more services on the physical asset 301, or a service center is able to receive and configure itself with the one or more machines, tools, parts, components etc. for conducting services on the physical asset 301, either before the arrival time of physical asset 301 at the service center or within a threshold amount of time following the arrival of the physical asset 301 at the service center. In step 515, a determination is made whether or not a modular service zone 309 within the selected service center is already configured with the arrangement of machines, tools, parts and other components required to perform the services on the physical asset 301. If a modular service zone 309 within the selected service center is already configured, the method 500 may proceed to step 517. In step 517 of method 500, the incoming physical asset 301 expected to arrive at the service center is scheduled to receive the services at service center and assigned to the previously equipped and configured modular service zone 309. Conversely, if an existing service zone within the selected service center has not been previously configured in a manner that would meet the needs to perform services on the incoming physical asset 301 expected to arrive at the service center, the method 500 may proceed to step 519.

During step 519, the repairing service 307 may transmit instructions to one or more robotic systems 311 positioned within the selected service center. The transmitted instructions may direct the robotic systems 311 to create a new modular service zone 309 within the service center or modify an existing service zone 309 enabling the existing service zone to be able to perform one or more requested services. Robotic systems 311 within the service center may be instructed to retrieve and/or arrange, within the designated service zone 309, one or more machines, tools, parts, accessories, or other components consistent with the performance of the requested services. The robotic systems may be instructed to pre-emptively prepare the service zone in accordance with the transmitted instructions, prior to the arrival of the physical asset 301 at the service center, or upon completion of ongoing services within the designated service zone 309 and/or prior to a scheduled timing to begin the requested services within the service zone 309. The robotic systems 311 preparing the modular service zone 309 may further arrange the service zone 309 by removing any unnecessary components or instruments that are present. For example, removing any machines, tools, components and/or parts that may be present within the service zone but may not be required for conducting services for the next incoming physical asset 301 assigned to the service zone, and/or any subsequent physical assets scheduled to be serviced within the same service zone 309 at a later point in time.

The embodiment of method 600 described by FIG. 6 may begin at step 601. During step 601 a plurality of physical assets 301 may transmit their respective digital twin models of the physical asset 301 to a server or cloud network running an instance of a repairing service 307. In step 603, the repairing service 307 identifies within the maintenance profile of each physical asset 301 submitting a digital twin model, the location of the physical asset 301, the type of services applicable to the physical asset 301 and any type of tools, equipment, parts, components or other accessories that may be needed to perform the services on the physical assets 301. In step 605, the repairing service 307 may classify the maintenance profiles of the plurality of physical assets 301 using one or more classification algorithms. The classification of each maintenance profile of the physical assets 301 may identify different degrees of commonality between the types of services that may be applicable to each physical asset and may group services having a threshold level of commonality into the same or nearby classifications.

In step 607, the repairing service 307 may generate a mapping between the types of services applicable to each of the physical assets 301 and the equipment, parts, machines, tools, components, accessories, etc., that may be required by the service center to perform each of the services that may be requested for the physical assets 301. In step 609, based on the classified commonalities between servicing different physical assets 301, repairing service 307 identifies the types of maintenance or servicing equipment required for conducting various services on the physical assets. In step 611, a determination is made whether one or more service requests are received by the repairing service 307 from one or more physical assets 301. If one or more service requests are not received, the method 600 may return to step 601, whereby new or updated digital twin models may be provided to the repairing service 307 over time. Otherwise, if in step 611 one or more service requests are received, the method 600 may proceed to step 613.

During step 613, the repairing service may, based on classification patterns of commonality between maintenance profiles of the physical assets 301 and the number of physical assets 301 within each classified maintenance profile, proactively create modular service zones 309 within a selected service center tasked with providing the services to the physical assets 301. The repairing service 307 may optimize the workflow for each service zone 309 in order to minimize repairing time, alterations to the service zone 309 between physical asset services and the wait time between services of physical assets 301. In step 615, a determination is made whether or not the modular service zone 309 visualized by the repairing service 307 optimizes the aggregated service time for completing services on the plurality of physical assets 301 that may be scheduled for servicing within one or more service zones 309. If the aggregate service time is not optimized, the method 600 may return to step 613 and further optimize the service zones(s) 309 based on the classification of the maintenance profiles and the commonality between them and simulate potential changes to the workflow in order to achieve optimization. Otherwise, if the service zones 309 visualized by the repairing service 307 do optimize the aggregate service time for completing the services on all the physical assets 301 scheduled with the service center and assigned to one or more service zones 309, the method may proceed to step 617.

During step 617, one or more service zones 309 may be implemented within the service center in accordance with the workflow generated by the repairing service 307. The repairing service may instruct the arrangement of the service zones 309 using one or more robotic systems 311 positioned within the service center. Instructions transmitted to the robotic systems 311 may instruct the arrangement of the service zones 309 in accordance with the optimized workflow and visualizations of the service zones 309 provided by the repairing service 307, resulting in an optimized aggregate service time for completing the services of the physical assets 301. In step 619, feedback data is captured describing the actual repairs, maintenance or other services provided to each of the physical assets and may be fed back to the repairing service 307 in order to improve classification models and optimization of the service zones 309 and/or workflow scheduling.

What is claimed is:

1. A computer-implemented method for predictively automating configurations of a modular service zone within a service site, the computer-implemented method comprising:
    receiving, by a processor, service requests from a plurality of physical assets requesting performance of services on the physical assets at the service site, a location of the physical assets and an estimated time of arrival for each of the physical assets at the service site;
    analyzing, by the processor, a digital twin model corresponding to each of the plurality of physical assets;
    creating, by the processor, a maintenance profile for each type of physical asset, describing classifications of the services for a corresponding physical asset including one or more machines, tools or parts required to perform the services on the physical asset;
    based on maintenance profiles of the physical assets and commonality between the one or more machines, tools or parts required to perform the services, creating, by the processor, one or more modular service zones within the service site comprising at least one of the one or more machines, the tools and the parts required to perform the services on the physical asset; and
    instructing, by the processor, a robotic system positioned within the service site to create or modify the modular service zone by positioning the machines, the tools and the parts for conducting each of the services on the physical assets within the modular service zone prior to the estimated time of arrival of each of the physical assets at the service site; and
    creating, or modifying, by the robotic system, the modular service zone according to instructions from the processor by moving autonomously through the service site and by positioning the machines, the tools and the parts for conducting each of the services on the physical assets within the modular service zone, prior to the estimated time of arrival of each of the physical assets at the service site.

2. The computer-implemented method of claim 1, wherein creating the one or modular service zones within the service site further comprises:
    creating, by the processor, a workflow configured to assign the physical assets to the one or more modular service zones for the performance of the services in an order based on a combination of the estimated arrival time and minimizing a number of changes to the one or more modular service zones between services provided to a first physical asset to a subsequent physical asset scheduled by the workflow.

3. The computer-implemented method of claim 2, wherein the order of the workflow is configured to assign the physical assets to the one or more modular service zones further maximizes a number of physical assets that are provided the services at the service site.

4. The computer-implemented method of claim 2, further comprising:
    modifying, by the processor, a first modular service zone within the service site, wherein the first physical asset receives one or more services within the first modular service zone, and prior to an arrival of the subsequent physical asset within the first modular service zone, adding or removing at least the one or more of the machines, tools or parts that lack commonality between maintenance profiles of the first physical asset and the subsequent physical asset, from the first modular service zone.

5. The computer-implemented method of claim 2, further comprising:
    optimizing, by the processor, the workflow to minimize repair time of the physical assets, alterations to each of the physical assets or wait time between the services provided to each of the physical assets assigned to a same modular service zone.

6. The computer-implemented method of claim 1, further comprising:
    capturing, by the processor, data describing the performance of the services within the one or more modular service zones; and
    inputting, by the processor, the data into classification models, providing feedback and continuous learning for improving classification of maintenance profiles assigned to each type of physical asset.

7. The computer-implemented method of claim 1, further comprising:
    mapping, by the processor, one or more of the services requested by the plurality of physical assets to the one or more machines, tools or parts required to perform the services.

8. A computer system for predictively automating configurations of a modular service zone within a service site comprising:
    a processor; and
    a computer-readable storage media coupled to the processor, wherein the computer-readable storage media contains program instructions executing, via the processor, a computer-implemented method comprising:
        receiving, by the processor, service requests from a plurality of physical assets requesting performance of services on physical assets at the service site, a location of the physical assets and an estimated time of arrival for each of the physical assets at the service site;

analyzing, by the processor, a digital twin model corresponding to each of the plurality of physical assets;

creating, by the processor, a maintenance profile for each type of physical asset, describing classifications of the services for a corresponding physical asset including one or more machines, tools or parts required to perform the services on the physical asset;

based on maintenance profiles of the physical assets and commonality between the one or more machines, tools or parts required to perform the services, creating, by the processor, one or more modular service zones within the service site comprising at least one of the one or more machines, the tools and the parts required to perform the services on the physical asset; and instructing, by the processor, a robotic system positioned within the service site to create or modify the modular service zone by positioning the machines, the tools and the parts for conducting each of the services on the physical assets within the modular service zone, prior to the estimated time of arrival of each of the physical assets at the service site; and creating, or modifying, by the robotic system, the modular service zone according to instructions from the processor by moving autonomously through the service site and by positioning the machines, the tools and the parts for conducting each of the services on the physical assets within the modular service zone, prior to the estimated time of arrival of each of the physical assets at the service site.

9. The computer system of claim 8, wherein creating the one or modular service zones within the service site further comprises:

creating, by the processor, a workflow configured to assign the physical assets to the one or more modular service zones for the performance of the services in an order based on a combination of the estimated arrival time and minimizing a number of changes to the one or more modular service zones between services provided to a first physical asset to a subsequent physical asset scheduled by the workflow.

10. The computer system of claim 9, wherein the order of the workflow is configured to assign the physical assets to the one or more modular service zones further maximizes a number of physical assets that are provided the services at the service site.

11. The computer system of claim 9, further comprising:
modifying, by the processor, a first modular service zone within the service site, wherein the first physical asset receives one or more services within the first modular service zone, and prior to an arrival of the subsequent physical asset within the first modular service zone, adding or removing at least the one or more of the machines, tools or parts that lack commonality between maintenance profiles of the first physical asset and the subsequent physical asset, from the first modular service zone.

12. The computer system of claim 8, further comprising:
optimizing, by the processor, the workflow to minimize repair time of the physical assets, alterations to each of the physical assets or wait time between the services provided to each of the physical assets assigned to a same modular service zone.

13. The computer system of claim 8, further comprising:
capturing, by the processor, data describing the performance of the services within the one or more modular service zones; and inputting, by the processor, the data into classification models, providing feedback and continuous learning for improving classification of maintenance profiles assigned to each type of physical asset.

14. The computer system of claim 8, further comprising:
mapping, by the processor, one or more of the services requested by the plurality of physical assets to the one or more machines, tools or parts required to perform the services.

15. A computer program product for predictively automating configurations of a modular service zone within a service site comprising:

one or more computer readable storage media having computer-readable program instructions stored on the one or more computer readable storage media, said program instructions executes a computer-implemented method comprising:

receiving, by a processor, service requests from a plurality of physical assets requesting performance of services on physical assets at the service site, a location of the physical assets and an estimated time of arrival for each of the physical assets at the service site;

analyzing, by the processor, a digital twin model corresponding to each of the plurality of physical assets;

creating, by the processor, a maintenance profile for each type of physical asset, describing classifications of the services for a corresponding physical asset including one or more machines, tools or parts required to perform the services on the physical asset;

based on maintenance profiles of the physical assets and commonality between the one or more machines, tools or parts required to perform the services, creating, by the processor, one or more modular service zones within the service site comprising at least one of the one or more machines, the tools and the parts required to perform the services on the physical asset; and instructing, by the processor, a robotic system positioned within the service site to create or modify the modular service zone by positioning the machines, the tools and the parts for conducting each of the services on the physical assets within the modular service zone, prior to the estimated time of arrival of each of the physical assets at the service site; and creating, or modifying, by the robotic system, the modular service zone according to instructions from the processor by moving autonomously through the service site and by positioning the machines, the tools and the parts for conducting each of the services on the physical assets within the modular service zone, prior to the estimated time of arrival of each of the physical assets at the service site.

16. The computer program product of claim 15, wherein creating the one or modular service zones within the service site further comprises:

creating, by the processor, a workflow configured to assign the physical assets to the one or more modular service zones for the performance of the services in an order based on a combination of the estimated arrival time and minimizing a number of changes to the one or more modular service zones between services provided to a first physical asset to a subsequent physical asset scheduled by the workflow.

17. The computer program product of claim 16, wherein the order of the workflow is configured to assign the physical assets to the one or more modular service zones further maximizes a number of physical assets that are provided the services at the service site.

18. The computer program product of claim 16, further comprising:

modifying, by the processor, a first modular service zone within the service site, wherein the first physical asset receives one or more services within the first modular service zone, and prior to an arrival of the subsequent physical asset within the first modular service zone, adding or removing at least the one or more of the machines, tools or parts that lack commonality between maintenance profiles of the first physical asset and the subsequent physical asset, from the first modular service zone.

19. The computer program product of claim 16, further comprising:

optimizing, by the processor, the workflow to minimize repair time of the physical assets, alterations to each of the physical assets or wait time between the services provided to each of the physical assets assigned to a same modular service zone.

20. The computer program product of claim 16, capturing, by the processor, data describing the performance of the services within the one or more modular service zones; and inputting, by the processor, the data into classification models, providing feedback and continuous learning for improving classification of maintenance profiles assigned to each type of physical asset.

\* \* \* \* \*